Patented Feb. 12, 1935

1,990,982

UNITED STATES PATENT OFFICE 1,990,982

BIOLOGICAL MEDICAMENT

Newell S. Ferry, Detroit, Mich., assignor to Parke, Davis & Company, Detroit, Mich., a corporation of Michigan No Drawing. Application October 13, 1930, Serial No. 488,547

7 Claims. (Cl. 167—78)

The invention relates to the production of biological medicaments for the treatment of gonorrheal infections and more particularly to the production of a toxin and an antitoxin specific to the organism causing the disease.

A known organism, Mic. gonorrheæ, is responsible for producing gonorrheal infections and a variety of bacterial preparations derived from this organism have been proposed for the treatment of the disease although without decisive results such as characterize the treatment of diphtheria or scarlet fever. Such products have been antigonococcic serum, gonococcus bacterins, a non-toxic gonococcus antivirus, etc.

The view is at present accepted by workers in this field that Mic. gonorrheæ does not produce an extracellular toxin and hence the preparation of a suitable therapeutic agent based upon the production of a true toxin and a true antitoxin has not been considered as hopeful.

I have discovered that Mic. gonorrheæ when grown under suitable conditions produces a heretofore unrecognized true extracellular toxin and I have invented methods of securing this toxin in high concentration and of producing from it a true antitoxin which can be used for quantitative neutralization of the toxin.

As a result of this invention new standardized medicaments can be made available for the treatment of gonorrheal infections, namely an antitoxin, a toxin, and combinations of toxin and antitoxin.

The toxin may be used for determining susceptibility to gonorrheal infections, for producing the antitoxin and for standardizing the latter. Possibly it may also be of value in the treatment of the condition either by injection as such or in its neutralized form. The artificially made antitoxin is useful for the direct treatment of the infection and especially for the relief from toxic symptoms. It may also be used for the preparation of neutralized toxin as well as for the identification of Mic. gonorrheæ because of its specific toxin neutralizing properties.

Preparation of gonococcus toxin

As set forth above, no one has heretofore obtained a toxin specific to Mic. gonorrheæ but by reason of my invention such toxin has now been obtained and it has been produced under such conditions that it is now possible to make use of the same in the manufacture of biological medicaments for the treatment of gonorrheal infections.

In carrying out my invention I have succeeded for the first time in growing the organism (Mic. gonorrheæ) luxuriantly with a heavy pellicle in a liquid culture medium.

The toxin is obtained by inoculating a suitable culture medium with a pure culture of the organism (Micrococcus gonorrheæ, Diplococcus gonorrheæ) specific to gonorrhea and gonorrheal infections. The culture medium must be a liquid medium in which the organism grows readily, such as glucose broth with ascites fluid or hormone broth with or without ascites fluid. After incubation for two to six or more days, the broth cultures are sterilized preferably, though not necessarily, by passage through germ proof filters. After the culture is sterilized it is best kept at refrigerator temperature. The toxin is then standardized preferably by the skin test method.

In preparing gonococcus toxin in liquid media it is preferable to develop and maintain the organisms in the form of a pellicle or film on the surface of the media. The method which I have found to give the most satisfactory results is to grow the organisms first in test tubes of hormone broth or some enriched media for several days or until a well developed film or pellicle has formed. As much of this pellicle as possible is then transferred by means of a wire loop from the test tube to the final culture flask and is carefully floated on the surface of the media in the flask instead of being planted or inoculated into the media as is customary with most bacteria. During the process of incubation of the culture flasks care is exercised to insure that the flasks are not moved or jarred. If dislodged, the pellicle will rapidly sink to the bottom of the flask, either delaying or entirely prohibiting the formation of the toxin due to the death of many of the organisms.

The toxic nature of this new gonococcus toxin is shown by the fact that when injected into mice it produces fatal results and when injected intradermally into rabbits, it develops inflammatory lesions in the skin where injected. Also when injected subcutaneously and intradermally in high dilutions into the human, it produces an irritation which causes inflammatory lesions at the site of injection.

Standardization of gonococcus toxin

To standardize the toxin, the undiluted gonococcus toxin is diluted and compared with a diluted gonococcus toxin which has already been standardized by a skin reaction or other specific reactions on susceptible individuals or animals. In carrying out the standardization test or the comparison between the new toxin and the standard toxin, various dilutions are made of the new lot of toxin and these are compared with a dilution of standard toxin which will just give a positive skin reaction or other reaction decided upon in a susceptible individual or animal.

Skin test for determining susceptibility to gonococcus toxin

Dilute or weak solutions of the toxin of known strength may be employed to determine susceptibility to gonococcus toxin and *Mic. gonorrheœ* by means of the skin test. The gonococcus toxin of known strength is preferably diluted with physiologic salt solution so that 0.1 cc. will represent one skin test dose. The test consists of an intracutaneous injection of 0.1 cc. of the diluted standardized toxin preferably on the flexor surface of the forearm. The reaction is noted at the end of 24 hours. The reaction is characterized by an area of reddening which should be at least 1 cm. in diameter. This reaction is controlled by injecting the same amount of toxin, in corresponding position on the other arm, the toxicity of which has been destroyed by heating or by neutralizing with gonococcus antitoxin.

Preparation of gonococcus antitoxin

The gonococcus toxin is used for the production of the gonococcus antitoxin. Animals immunized with injections of gonococcus toxin will produce an antitoxin which will neutralize gonococcus toxin when mixed with it in proper quantities.

The preparation of the gonococcus antitoxin is preferably carried out in the following manner: The gonococcus toxin prepared in the manner above described is injected into animals, preferably horses, in gradually increasing doses, beginning with a dose small enough not to produce severe symptoms in the animal, and gradually increasing to the tolerance of the animal. The toxin used in these injections need not necessarily be sterile for in some cases it may be advisable to introduce the living organism with the toxin. When a sterile toxin is injected it may either be a product in which the organisms have been killed and are still contained in the liquid, or it may be a solution which has been freed from all organisms. After preliminary tests show the antitoxin is of sufficient strength as tested against the gonococcus toxin, the horse or other animal is bled and the serum or plasma may be concentrated and refined in order to avoid unnecessary serum reactions. The gonococcus antitoxin is then standardized by determining how many skin test doses of a standard gonococcus toxin one cubic centimeter of the antitoxin will neutralize. The standardization of the gonococcus toxin and the production, refinement, and standardization of the antitoxin, make the use of these products practical as a routine measure in the identification of the *Mic. gonorrheœ* and the treatment of gonorrheal infections.

The indentification of Mic. gonorrheœ

The use of the toxin serves as a method of recognizing the organism which is capable of producing gonorrheal infections. The organism to be identified is isolated in pure culture and grown on suitable media, preferably richer than ordinary beef broth. After a reasonable incubation the culture is clarified of organisms or sterilized by filtration, centrifugation or other suitable means and the sterile filtrate is tested for its toxicity, first comparing it with a gonococcus toxin of known strength. After it is determined that it produces a skin reaction on individuals known to be susceptible to gonorrhea, it is mixed with the new gonococcus antitoxin which is now shown to neutralize the newly discovered gonococcus toxin. If the toxin is so neutralized by the gonococcus antitoxin that it will no longer produce a skin reaction, it may be considered that the organism under consideration is capable of producing a toxin specific to gonorrheal infections and that the organism is also specific.

It is further to be understood that gonococcus toxin may be obtained in several forms, first containing live organisms, second containing killed organisms, and third free from all organisms. All of these forms have certain applications for medical use, particularly for the preparation of the antitoxin. In the appended claims the term toxin is intended to cover any of the above mentioned forms while the term sterile toxin refers to a product which may or may not contain killed organisms but contains no living organisms. Whenever it is intended to refer to the toxin itself free from all organisms, I have specifically stated that the product is free from organisms.

What I claim as my invention is:

1. A true extracellular toxin specific to gonorrheal infections obtained from a culture of *Mic. gonorrheœ* and capable of being neutralized by gonococcus antitoxin.

2. A true antitoxin specific to gonorrheal infections comprising the serum obtained from an animal after the injection with a true extracellular toxin specific to gonorrheal infections and which serum is capable of neutralizing said true extracellular toxin.

3. A true extracellular toxin specific to gonorrheal infections obtained from a culture of *Mic. gonorrheœ* and capable of being neutralized by gonococcus antitoxin, said toxin being sterile and free from bacterial cells.

4. A true antitoxin specific to gonorrheal infections comprising a serum obtained from an animal after injection with a true extracellular sterile bacteria-free toxin specific to gonorrheal infections which serum is capable of neutralizing said extracellular toxin.

5. The process of obtaining a true extracellular gonococcus toxin comprising growing *Mic. gonorrheœ* on a suitable liquid culture medium to form a pellicle, maintaining said medium at incubating temperatures until said pellicle begins to disintegrate due to the natural death of the organisms and eliminating said organisms before any substantial autolysis takes place.

6. The process of obtaining a true extracellular gonococcus toxin comprising growing *Mic. gonorrheœ* on a suitable liquid culture medium to form a pellicle, maintaining said medium under incubating conditions for a period not substantially exceeding six days, separating the organisms from the liquid and sterilizing the liquid.

7. The process of obtaining an antitoxin specific to gonorrhea infections comprising growing *Mic. gonorrheœ* on a suitable liquid culture medium for a period of time not substantially greater than six days, separating the organisms from said liquid thereby forming a true extracellular toxin, injecting said true extracellular toxin into an animal and obtaining from the blood serum of said animal a true antitoxin specific to gonorrhea infections.

NEWELL S. FERRY.